De W. C. Cumings,
Straw Cutter.
No. 1,911. Reissued Mar. 28, 1865.
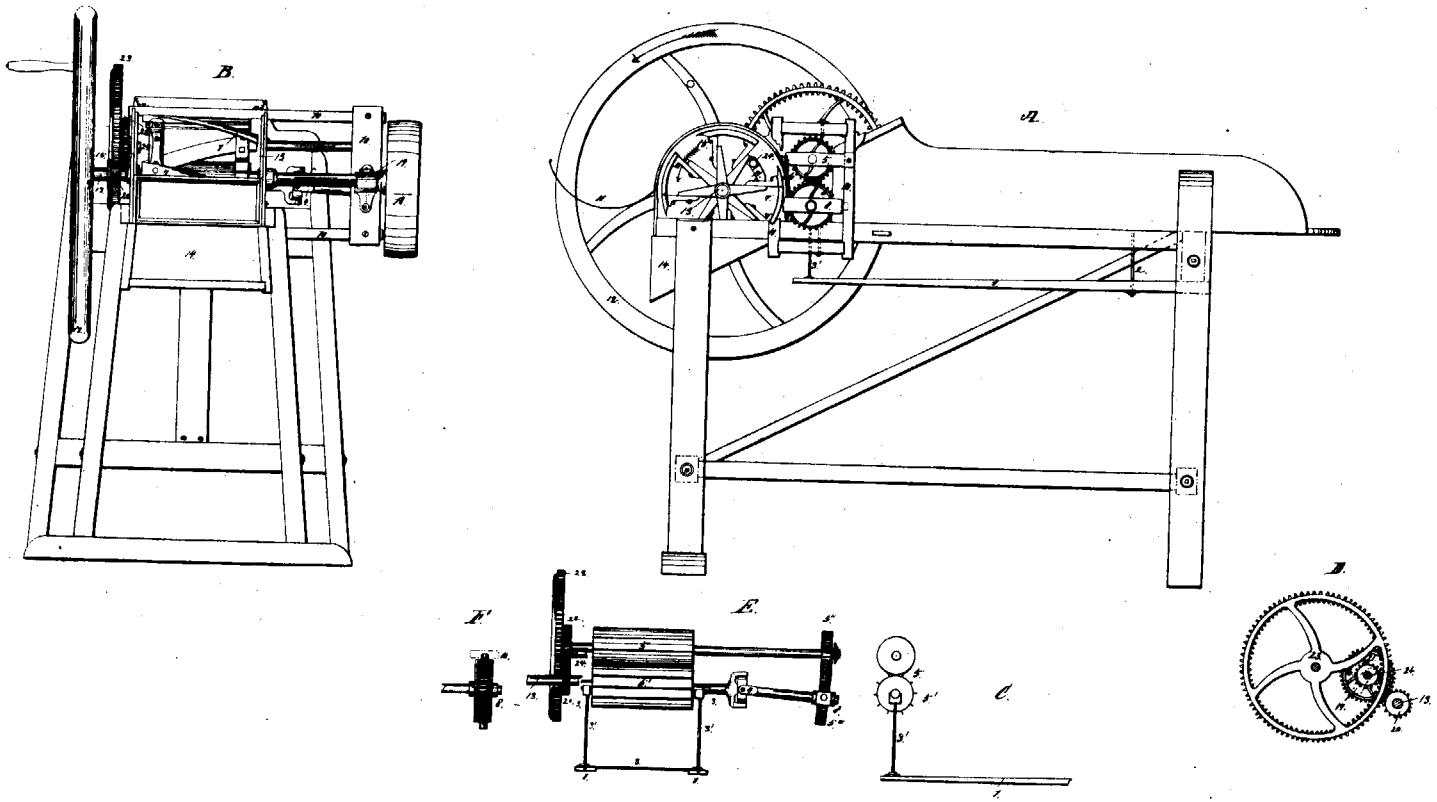
M. PETERS, PHOTO-LITHOGRAPHER, WASHINGTON, D. C.

UNITED STATES PATENT OFFICE.

DEWITT C. CUMINGS, OF FULTON, NEW YORK.

IMPROVEMENT IN STRAW-CUTTERS.

Specification forming part of Letters Patent No. 13,385, dated August 7, 1855; Reissue No. 847, dated November 8, 1859; Reissue No. 1,911, dated March 28, 1865.

*To all whom it may concern:*

Be it known that I, DEWITT C. CUMINGS, of Fulton, in the county of Oswego and State of New York, have invented certain new and useful Improvements in Machines for Cutting Hay, Straw, or the Like; and I do hereby declare the following to be a full, clear, and exact description thereof, reference being had to the accompanying drawings, making a part of this specification, in which—

Figure A represents a side view of the machine, partly in elevation and partly in section. Fig. B represents an end view of the same. Fig. C represents an end view of the feed-rollers and spring attached thereto. Fig. D represents a detached view of the gearing for operating the feed rolls. Fig. E represents a front view of the feed-rollers, with the gearing for operating them; and Fig. F represents a plan of the lower gear-wheel, through which motion is communicated to the lower roller, and showing the compensating method of hanging it.

The same figures or marks of reference indicate the same parts of the machine throughout all the separate drawings.

The nature of my invention consists, first, in operating the lower adjustable feed-roller by means of a spur-wheel hung in a vibrating frame or yoke, the axis of which is connected with the said roller by means of a universal or yielding coupling-joint, when said roller is hung or supported by spring-bearings, for a purpose that will be hereinafter described; and my invention further consists in the employment of a cylinder provided with a knife or knives, which have an upward cylindrical cut, when the same is arranged with two independent feed-rollers, the lower one of which is supported on a spring or springs.

To enable others skilled in the art to make and use my invention, I will proceed to describe the same with reference to the drawings.

I construct the frame and shoe or feed-box similar to that of the ordinary straw-cutters heretofore used, and at or near the end of the horizontal framing is hung a shaft, 13, with a series of radial arms (usually four in number) at equal distances apart, and at each end, within the side plates, 15, and to the extremities of these arms, obliquely at an angle of about twenty-five degrees from a line parallel with the shaft, are attached the knives 7, extending from end to end thereof.

Thus far my cylindrical rotary cutter is similar to those heretofore in use; but it differs from them in this—viz., in the edges of the knives being set to cut upward instead of downward, and revolving in the direction of the arrow, Fig. A, and by their oblique position effect a shearing cut on the straw or other material against the under side of the mouth-piece or cutting-plate 6, which is placed horizontally across the frame and parallel to the axis of the cylindrical knives and in close proximity to them. The reasons for and advantages of this mode of cutting are, that all dry produce which is usually cut up to feed stock contains more or less dust and dirt, and in the numerous methods of cutting downward and feeding it to the cutters the dirt, &c., is separated from the vegetable matter and collects on the bottom of the feed-box, and is thence carried forward in mass under the knives and dulls them very quickly, and, although once separated, it is again mixed with the feed by discharging it into the same receiver, and must be very injurious to the cattle fed upon it, while by my invention the feed-rollers, in pressing the material between them, loosen the dirt, and, on its passage from said rollers to the cutting-edges of the knives, is allowed to spread, which liberates the dust, grit, &c., and it falls beneath the machine through an opening beneath the roller, and by cutting upward no portion of it can collect on the mouth-piece or cutting-plate, or come in contact with the edges of the knives, and nothing but the clean material is discharged into the receiver.

The feeding mechanism consists of a roller, 5, hung in permanent bearings in the frame 10, with a spur-wheel, 23, on one end of its axis, and another spur-wheel, 5″, on its opposite end. The wheel 23 is made with both internal and external gear, through which motion is communicated to the feed-roll, either directly, by gearing into the pinion 20 on the axis of the cutters, or through an intermediate wheel, 22, and pinion 21, the intermediate wheel gearing into the pinion 20 on the cutter-shaft, to which said pinion is attached by a set-screw, so that it may be readily moved on the shaft so as to gear into either of said wheels 23 or 22. The pinion 21, on the same axis as the intermediate wheel, gears into the internal teeth of the wheel 23, and thus transmits its motion to the feed-roll in the same direction as if the pinion 20 were directly in gear with the wheel 23, whereas if the pinion 21 geared into the external teeth of the wheel 23 it would move it in the contrary direction, and require another intermediate wheel to turn it in the right direction. The stud 24, or axis of the intermediate wheel and pinion, is fitted in a curvilinear slot, 17, in the side plate, 15, so that its position may be changed to admit of different-sized pinions being used to vary the speed of the feed-rollers, and consequently varying the length of the fragments cut off from the mass.

Beneath the roller 5 and parallel with it is a fluted or ribbed roller, 5′, of similar length and diameter as that above it, and having its axis in bearings supported on or controlled by springs 1, by which it is borne up against the fixed or non-yielding roller, and so that it may accommodate itself to the varying quantity that may from time to time be fed through between the rolls.

To communicate rotary motion to the axis of the roller 5′, which has a rising and falling motion, parallel or oblique, as the thickness of the material passing through may determine, it is necessary to provide it with a compensating-gear attachment, which will remain in gear at all times with the other gears that give it motion, regardless of its varying positions, and for this purpose the wheel 5‴, gearing into that on the axis of the upper feed-roll, is hung in a yoke, 8, pivoted at each end in the framing 10. The axis of this wheel is connected with the axis of the lower feed-wheel roller by a universal joint, 4, which admits of the various changes of position of said roller, while the wheel 5‴, being hung in the yoke, accommodates itself to all such changes of position.

With the ordinary feed apparatus, where the rollers are of equal diameter, the upper portion of the material to be cut, or that portion in contact with the smooth roller, has a tendency to slip, and there is no uniformity in the length of the material cut. To remedy this I cause the periphery of the smooth roller to travel at a greater velocity, either by using a smaller wheel on its axis than that on the axis of the ribbed roller, or by other equivalent mechanical means. The springs 1, at their thicker ends, may bear against the under side of a cross-piece in the framing of the feed-box, and may be supported by bolts 2, with nuts on their under side for making them adjustable, if found necessary or desirable to do so. The thin ends of the springs bear up the pillar boxes or bearings of the lower feed-roll, and thus make it what is known as an "elastic" or "yielding" feed-roll.

To operate this machine, the man should stand with his left side to the feed-box, turning the balance-wheel 12 by the handle with his right hand, and in the direction of the arrow, Fig. A, and feeding the material, or aid in so feeding the material, to the rollers with his left hand. The machine may be worked by horse-power, or any other power, by a band passing over the pulley 18. In its operation it both cleans or dusts the hay as well as cuts it.

Having thus fully described my invention, what I claim therein as new, and desire to secure by Letters Patent, is—

1. Operating the adjustable lower feed-roll by means of a spur-wheel hung in a vibrating frame or yoke, the axis of which is connected with the said roller by means of a universal coupling, when said roller is supported on springs, so as to be elastic or yielding, substantially as and for the purpose described.

2. The employment of a cylinder provided with a knife or knives, which have an upward cylindrical cut, when the same is arranged with two independent feed-rollers, the lower one of which is supported on a spring or springs, substantially as and for the purpose herein described.

D. C. CUMINGS.

Witnesses:
S. CROMBIE,
H. C. HOWE.